United States Patent
Zhu et al.

(10) Patent No.: US 11,896,946 B2
(45) Date of Patent: Feb. 13, 2024

(54) DEVICE AND METHOD FOR INCREASING SOLID HOLDUP IN REACTION CRYSTALLIZER

(71) Applicants: QINGDAO INSTITUTE OF BIOENERGY AND BIOPROCESS TECHNOLOGY, CHINESE ACADEMY OF SCIENCES, Qingdao (CN); INSTITUTE OF PROCESS ENGINEERING, CHINESE ACADEMY OF SCIENCES, Beijing (CN)

(72) Inventors: Quanhong Zhu, Qingdao (CN); Qingshan Huang, Qingdao (CN); Hang Xiao, Qingdao (CN); Chao Yang, Beijing (CN)

(73) Assignee: QINGDAO INSTITUTE OF BIOENERGY AND BIOPROCESS TECHNOLOGY, CHINESE ACADEMY OF SCIENCES & INSTITUTE OF PROCESS ENGINEERING, CHINESE ACADEMY OF SCIENCES

( * ) Notice: Subject to any disclaimer, the term of this patent is extended or adjusted under 35 U.S.C. 154(b) by 633 days.

(21) Appl. No.: 17/051,735

(22) PCT Filed: Jul. 7, 2020

(86) PCT No.: PCT/CN2020/100523
§ 371 (c)(1),
(2) Date: Dec. 15, 2020

(87) PCT Pub. No.: WO2021/047266
PCT Pub. Date: Mar. 18, 2021

(65) Prior Publication Data
US 2021/0220796 A1  Jul. 22, 2021
US 2022/0016594 A9  Jan. 20, 2022

(30) Foreign Application Priority Data
Sep. 11, 2019  (CN) .......................... 201910856053.6

(51) Int. Cl.
*B01J 19/06*  (2006.01)
*B01D 9/00*  (2006.01)

(52) U.S. Cl.
CPC ............ *B01J 19/06* (2013.01); *B01D 9/0059* (2013.01); *B01D 9/0063* (2013.01); *B01D 2009/0086* (2013.01)

(58) Field of Classification Search
CPC ....... B01J 19/06; B01D 9/0059; B01D 9/0063
See application file for complete search history.

(56) References Cited

FOREIGN PATENT DOCUMENTS

| CN | 207024683 U | * | 2/2018 |
| CN | 207101976 U | * | 3/2018 |

* cited by examiner

*Primary Examiner* — Yong L Chu
(74) *Attorney, Agent, or Firm* — BOTKIN & HALL, LLP

(57) ABSTRACT

A device and method for increasing solid holdup in a reaction crystallizer are disclosed. The device includes a discharge pipe, a clear liquid pipe, a clear liquid tank and a gas collecting pipe. A lower end of the discharge pipe is inserted into the crystallizer below the liquid level, while that of the clear liquid pipe is inserted into the clear liquid tank below the liquid level. By using the gas collecting pipe, the reaction crystallizer and the clear liquid tank are communicated all the time. When feeding, a liquid-solid mixture in the crystallizer automatically enters the discharge pipe and flows upward slowly therein, during which solid particles gradually settle down and automatically fall back into the crystallizer while the clear liquid keeps on flowing upward, enters the clear liquid pipe and thereby flows into the clear liquid tank. The clear liquid tank maintains a constant liquid level via overflowing.

8 Claims, 2 Drawing Sheets

DEVICE AND METHOD FOR INCREASING SOLID HOLDUP IN REACTION CRYSTALLIZER

TECHNICAL FIELD

The disclosure relates to the field of reaction crystallizers, and more particularly, to a technical solution for increasing solid holdup in a reaction crystallizer and controlling the morphology and size distribution of crystal particles.

BACKGROUND

The increase of solid holdup in the reaction crystallizer can not only increase the volume utilization efficiency of the equipment, but also effectively improve the surface morphology, microstructure, and size distribution of the crystal particles.

For a fully stirred reaction crystallizer, the increase of solid holdup is normally achieved by increasing the concentration of the feeding solution. However, such a method has the following disadvantages. On the one hand, the concentration of the feedstock solution is limited by the solubility of the solute; one the other hand, the concentration of the feeding solution is limited by the requirement on the local supersaturation degree in the reaction crystallizer, which should not be too high in many circumstances. In summary, the concentration of the feedstock solution cannot be increased infinitely. Ultimately, the increase of solid holdup in the reaction crystallizer is limited as for this method, thus influencing the morphology and size distribution of crystal particles.

In addition, the solid holdup in a reaction crystallizer may also be increased by returning solid particles to the reaction crystallizer after a slurry withdrawn from the reaction crystallizer being subjected to a solid-liquid separation outside. Invention patent No. CN100586550C provides a continuous liquid-solid separation method and apparatus for a slurry-bed reactor. The feedstock and catalyst particles undergo a contact reaction in the reactor; the generated slurry is introduced into a separation unit that includes an inclined plate settler, and the slurry was rapidly separated into the clear supernatant liquid and concentrated slurry; the concentrated slurry is returned to the reactor for continuous use. On the other hand, the clear liquid flows upward through the gap between the plates and is discharged out of the reactor. This invention can realize the continuous separation and recycling of solid catalyst particles and liquid products. This method, however, has the disadvantages of high equipment investment, complex operation, high operation cost, incomplete separation and difficulty for continuous operation.

Therefore, by now, there is still no good method that can effectively increase the solid holdup in the reaction crystallizer.

SUMMARY

The disclosure aims to solve the above technical problems and provide a method for effectively increasing solid holdup in a reaction crystallizer and controlling the morphology and size distribution of crystals. The method has the advantages of low equipment investment, low operation cost, good safety and reliability, and ease of continuous operation and automatic control.

A device for increasing solid holdup in a reaction crystallizer includes a discharge pipe, a clear liquid pipe, a gas collecting pipe and a clear liquid tank, wherein the crystallizer and the clear liquid tank are connected with each other by means of the discharge pipe and the clear liquid pipe. Hence, the crystallizer and the clear liquid tank always have the same liquid level.

Preferably, an inverted cone-shaped expansion segment is disposed on an upper portion of the discharge pipe to reduce a liquid velocity and improve liquid-solid separation efficiency; a cone angle is required to be greater than a reposing angle of crystal particles to prevent blockage by accumulation.

Preferably, an exhaust pump is disposed on the gas collecting pipe.

A method for increasing solid holdup in a reaction crystallizer is also provided. Based on the above device for increasing solid holdup in a reaction crystallizer, liquid-solid separation of a slurry from the crystallizer is achieved in the discharge pipe as per the sedimentation theory. In this case, the solid particles could fall back to the crystallizer and the clear liquid enters the clear liquid tank through the clear liquid pipe and overflows; and the gas collecting pipe collects a gas entering the discharge pipe and the clear liquid pipe.

Preferably, a liquid level in the gas collecting pipe is required to be above a joint of the discharge pipe and the clear liquid pipe all the time, thus ensuring that the crystallizer and the clear liquid tank are communicated all the time with the same liquid level.

Preferably, the exhaust pump disposed on the gas collecting pipe discharges the gas out of the gas collecting pipe irregularly, thus ensuring that the liquid level therein is above the joint of the discharge pipe and the clear liquid pipe all the time.

Preferably, a falling rate of the liquid level in the gas collecting pipe can be reduced by increasing a cross-sectional area thereof, so that the gas may not need to be discharged during a whole reaction process.

The disclosure has the following beneficial effects: a discharge pipe, a gas collecting pipe, and a clear liquid pipe are connected by a Tee-junction; when a solid-liquid mixture moves upward slowly in the discharge pipe, solid particles return to the reaction crystallizer by sedimentation and the clear liquid flows out of the reaction crystallizer continuously through the clear liquid pipe, thus increasing the solid holdup in the reaction crystallizer and improving the morphology and size distribution of crystal particles. In use, the gas can be extracted out of the gas collecting pipe under manual control or automatic control conditions to ensure that the liquid level in the gas collecting pipe is above the joint of the discharge pipe and the clear liquid pipe all the time, thus ensuring that the reaction crystallizer and the clear liquid tank are communicated all the time with the same liquid level. The device is ingenious in design, simple in structure, low in cost, and good in continuity of operation.

DETAILED DESCRIPTION

Example 1

The method provided in the disclosure will be explained in detail below in conjunction with FIG. 1.

Figure 1:
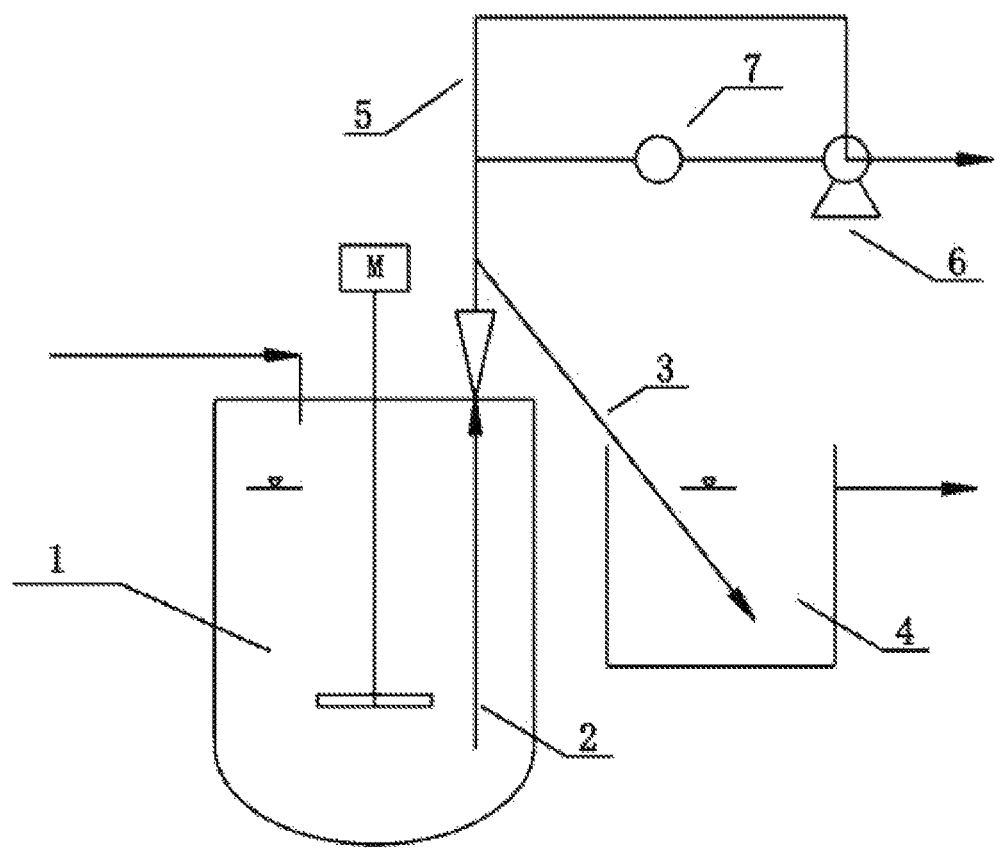
FIG. 1 is a schematic diagram of a device with automatic gas discharge according to an example of the disclosure.

Referring to FIG. 1, a discharge pipe 2 has a lower end inserted into a reaction crystallizer 1 below the liquid level and an upper end connected to the upper end of a clear liquid pipe 3 and the lower end of a gas collecting pipe 5. The lower end of the clear liquid pipe 3 is inserted into a clear liquid tank 4 below the liquid level. An upper portion of the gas collecting pipe 5 is connected to an automatic liquid level control system 7. The automatic liquid level control system 7 is capable of sending a signal to control the start and stop or revolution speed of an exhaust pump 6.

Firstly, a certain amount of clear liquid is added to the clear liquid tank 4, so that the lower end of the clear liquid pipe 3 is located below the liquid level. The automatic liquid level control system 7 is started when the liquid level in the reaction crystallizer 1 is close to the liquid level in the clear liquid tank 4. Since the liquid level in the gas collecting pipe 5 is below a lower limit, the exhaust pump 6 is automatically turned on to pump a liquid into the discharge pipe 2, the clear liquid pipe 3 and the gas collecting pipe 5. The exhaust pump 6 is automatically turned off until the liquid level in the gas collecting pipe 5 reaches an upper limit. In this case, the reaction crystallizer 1 and the clear liquid tank 4 are communicated with each other. They have the same liquid level according to the theory of communicating vessels.

Subsequently, a solid-liquid mixture in the reaction crystallizer 1 automatically enter the discharge pipe 2 and flow upward slowly during the pumping of a feedstock solution into the reaction crystallizer 1. Due to a low flow velocity, solid particles may gradually settle down and fall back into the reaction crystallizer 1. On the other hand, the clear liquid keeps moving upward and enters the clear liquid pipe 3 at a Tee-junction to flow into the clear liquid tank 4. By this method, the clear liquid can be discharged solely with solid particles in the reaction crystallizer 1 being held up therein so that the solid holdup in the reaction crystallizer 1 increases gradually, thus allowing for changes in morphology and size distribution of crystals.

When the liquid level in the clear liquid tank 4 reaches an overflow port, the clear liquid overflows, after which the liquid level in the clear liquid tank 4 and that in the reaction crystallizer 1 stop changing. However, the clear liquid can continuously flow out of the reaction crystallizer 1, while solid particles are held up in the reaction crystallizer 1 so that the solid holdup in the reaction crystallizer 1 increases continuously.

The gas entrained in the slurry from the reaction crystallizer 1 is likely to enter the discharge pipe 2. It will escape from the liquid gradually under the negative pressure condition and be concentrated into the gas collecting pipe 5, resulting in the falling of the liquid level in the gas collecting pipe 5. After a period of time, this will cause that the discharge pipe 2 and the clear liquid pipe 3 are no longer communicated with each other so that the clear liquid in the reaction crystallizer 1 cannot be discharged and the liquid level therein will rise. Hence, the automatic liquid level control system 7 is provided here. When it detects that the liquid level in the gas collecting pipe 5 falls to the lower limit, the exhaust pump 6 will be automatically turned on to raise the liquid level in the gas collecting pipe 5. When the automatic liquid level control system 7 detects that the liquid level in the gas collecting pipe 5 reaches the upper limit, the exhaust pump 6 be automatically turned off. The exhaust pump 6 will be turned on again when the liquid level in the gas collecting pipe 5 falls to the lower limit again. This process happens in cycles. In this way, the liquid level in the gas collecting pipe 5 will fluctuate between the upper and lower limits so that the reaction crystallizer 1 and the clear liquid tank 4 are communicated all the time. The clear liquid in the reaction crystallizer 1 can be discharged continuously with the solid particles being held up therein so that the solid holdup in the reaction crystallizer 1 increases continuously with the feeding time. Furthermore, the morphology and size distribution of the crystal particles can be expected to be improved.

Example 2

The method provided in the disclosure will be explained in detail below in conjunction with the FIG. 2.

Figure 2:
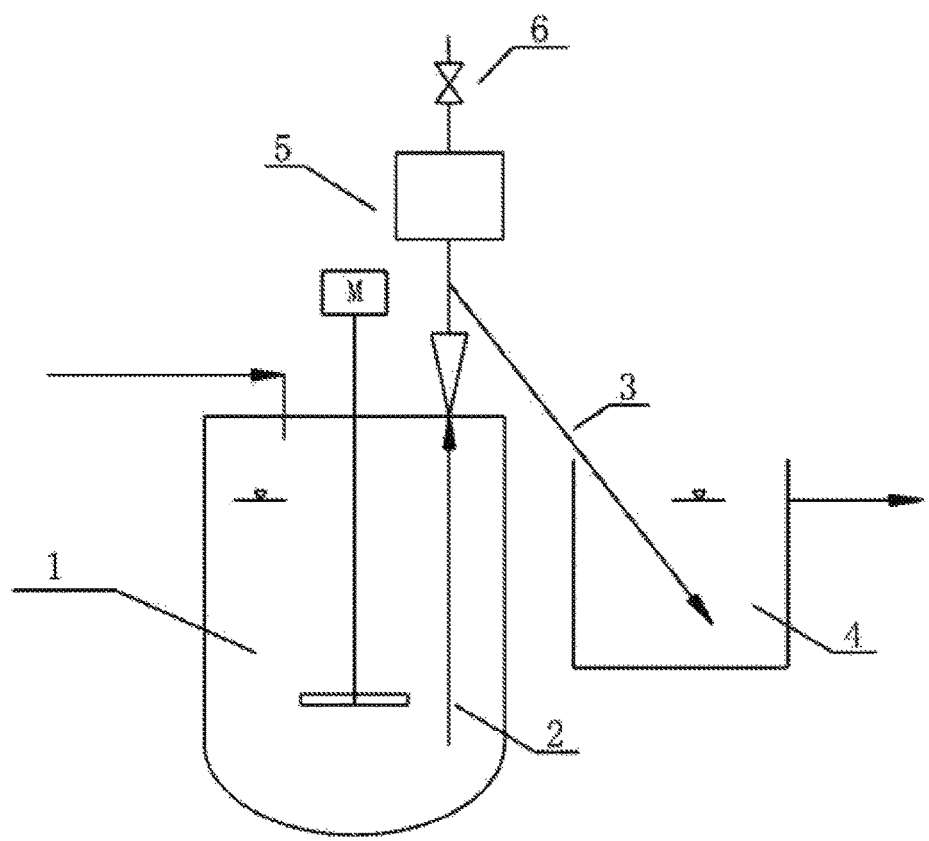
FIG. 2 is a schematic diagram of a device with no gas discharge according to an example of the disclosure.

Referring to FIG. 2, a discharge pipe 2 has a lower end inserted into a reaction crystallizer 1 below the liquid level and an upper end connected to the upper end of a clear liquid pipe 3 and the lower end of a gas collecting pipe 5. The lower end of the clear liquid pipe 3 is inserted into a clear liquid tank 4 below the liquid level. An upper portion of the gas collecting pipe 5 has an expansion segment, and a valve is arranged on an upper portion of the expansion segment.

Firstly, a certain amount of clear liquid is added to the clear liquid tank 4, so that the lower end of the clear liquid pipe 3 is submerged below the liquid level. When the liquid level in the reaction crystallizer 1 is close to that in the clear liquid tank 4, the valve 6 is opened to pump the liquid into the discharge pipe 2, the clear liquid pipe 3, and the gas collecting pipe 5. The valve 6 is closed until the expansion segment of the gas collecting pipe 5 is filled with the liquid. In this case, the reaction crystallizer 1 and the clear liquid tank 4 become communicated with each other. They will have the same liquid level according to the theory of communicating vessels.

Subsequently, the slurry in the reaction crystallizer 1 will automatically enter the discharge pipe 2 and flow upward slowly during the pumping of the feedstock solution into the reaction crystallizer 1. Due to the low flow velocity, the solid particles will gradually settle down and fall back into the reaction crystallizer 1. On the other hand, the clear liquid will keep moving upward, enter the clear liquid pipe 3 at the Tee-junction and flow into the clear liquid tank 4. By this method, the clear liquid can be discharged solely with the solid particles being held up in the reaction crystallizer 1 so that the solid holdup in the reaction crystallizer 1 increases gradually, thus allowing for changes in morphology and size distribution of particles.

When the liquid level in the clear liquid tank 4 reaches the overflow port, the clear liquid overflows. Thereafter, the liquid level in the clear liquid tank 4 and that in the reaction crystallizer 1 will remain constant. However, the clear liquid can continuously flow out of the reaction crystallizer 1, while the solid particles will be held up in the reaction crystallizer 1 so that the solid holdup in the reaction crystallizer 1 will increase continuously.

The gas entrained in the slurry from the reaction crystallizer 1 is likely to enter the discharge pipe 2 and escape gradually under the negative pressure condition. It will be concentrated to the gas collecting pipe 5, resulting in the liquid level falling therein. In this case, the volume of the expansion segment of the gas collecting pipe 5 should be designed reasonably, so that the liquid level in the gas collecting pipe 5 is above the joint of the discharge pipe 2 and the clear liquid pipe 3 all the time and the reaction crystallizer 1 and the clear liquid tank 4 are communicated all the time during the whole reaction process. The communication of the reaction crystallizer 1 and the clear liquid tank 4 can ensure the successful discharge of the clear liquid from the reaction crystallizer 1.

The above are merely descriptions of specific implementations of the disclosure, and the protection scope of the disclosure is not limited thereto. Any modification or replacement easily conceived by those skilled in the art within the technical scope of the disclosure should fall within the protection scope of the disclosure. Therefore, the protection scope of the disclosure should be subject to the protection scope of the appended claims.

What is claimed is:

1. A device for increasing solid holdup in a reaction crystallizer, comprising:
    a reaction crystallizer;
    a clear liquid tank;
    a discharge pipe having a discharge pipe first end;
    wherein discharge pipe first end resides in the reaction crystallizer;
    a clear liquid pipe having a clear liquid pipe first end and a clear liquid pipe second end;
    wherein the clear liquid pipe first end resides in the clear liquid tank;
    wherein the clear liquid pipe second end connects to the discharge pipe at a first pipe junction at a first pipe junction height, thereby allowing fluid to flow between the discharge pipe and the clear liquid pipe;
    a gas collecting pipe having a gas collecting pipe lower end and a gas collecting pipe intermediate region at a gas collecting pipe intermediate region height;
    wherein gas collecting pipe lower end communicates with the discharge pipe;
    wherein the gas collecting pipe intermediate region height is above the first pipe junction height; and
    whereby, when a level of liquid residing in the reaction crystallizer is above the discharge pipe first end, a level of liquid in the clear liquid tank is above a level of the clear liquid pipe first end, and fluid fills the gas collecting pipe intermediate region, then the level of liquid residing in the reaction crystallizer and the level of liquid in the clear liquid tank attain the same level.

2. The device of claim 1, wherein an inverted cone-shaped expansion segment is disposed on an upper portion of the discharge pipe to reduce a liquid velocity and improve liquid-solid separation efficiency; and
    wherein a cone angle of the inverted cone-shaped segment is greater than a reposing angle of crystal particles to prevent blockage by accumulation.

3. The device of claim 1, wherein the gas collecting pipe has a second end that connects to an input of an exhaust pump.

4. A method for increasing solid holdup, in an apparatus comprising a reaction crystallizer;
    a clear liquid tank;
    a discharge pipe having a discharge pipe first end;
    wherein discharge pipe first end resides in the reaction crystallizer;
    a clear liquid pipe having a clear liquid pipe first end and a clear liquid pipe second end;
    wherein the clear liquid pipe first end resides in the clear liquid tank;
    wherein the clear liquid pipe second end connects to the discharge pipe at a first pipe junction at a first pipe junction height, thereby allowing fluid to flow between the discharge pipe and the clear liquid pipe;
    a gas collecting pipe having a gas collecting pipe lower end and a gas collecting pipe intermediate region at a gas collecting pipe intermediate region height;
    wherein gas collecting pipe lower end communicates with the discharge pipe;
    wherein the gas collecting pipe intermediate region height is above the first pipe junction height; and whereby, when a level of liquid residing in the reaction crystallizer is above the discharge pipe first end, a level of liquid in the clear liquid tank is above a level of the clear liquid pipe first end, and fluid fills the gas collecting pipe intermediate region, then the level of liquid residing in the reaction crystallizer and the level of liquid in the clear liquid tank attain the same level, the method comprising:
    adding a clear liquid to the clear liquid tank, so that the clear liquid pipe first end is submerged;
    adding liquid to the reaction crystallizer, so that the discharge pipe first end is submerged;
    exhausting gas from the gas collecting pipe, thereby sucking liquid up into the discharge pipe and sucking liquid up into the clear liquid pipe until the reaction crystallizer and the clear liquid tank are in liquid communication with one another; and
    pumping a feedstock solution into the reaction crystallizer, thereby resulting in flow into the discharge pipe and from the discharge pipe through the clear liquid pipe into the clear liquid tank.

5. The method of claim 4, wherein the clear liquid tank comprises an overflow port, and continuing pumping the feedstock solution into the reaction crystallizer until after the level of liquid in the clear liquid tank reaches the level of the overflow port.

6. The method of claim 4, further comprising configuring an automatic control system to control the liquid level in the gas collecting pipe so that the liquid level in the gas collecting pipe remains above a level at which the reaction crystallizer and the clear liquid tank remain in liquid communication with one another.

7. The method of claim 4, further comprising configuring the gas collecting pipe to have an expansion segment, and configuring an automatic control system to control the liquid level in the gas collecting pipe so that the liquid level remains in the expansion segment.

8. The method of claim 7 further comprising configuring the gas collecting pipe to have an expansion segment providing a valve above the expansion segment.

* * * * *